United States Patent [19]
Roth et al.

[11] 3,795,183
[45] Mar. 5, 1974

[54] APPARATUS FOR MAKING CAKES
[75] Inventors: Howard Roth, Bronx; Robert F. Schiffmann, Brooklyn; Harold B. Kaufman, Jr., New York; John H. Moyer, Garden City, all of N.Y.
[73] Assignee: DCA Food Industries, Inc., New York, N.Y.
[22] Filed: June 28, 1971
[21] Appl. No.: 157,232

Related U.S. Application Data
[63] Continuation-in-part of Ser. No. 836,385, June 25, 1969, abandoned.

[52] U.S. Cl. ............... 99/353, 99/451, 425/97, 425/133, 425/174.8 R
[51] Int. Cl. ............... A21b 5/00, A21b 2/00
[58] Field of Search ....... 99/353, 354, 450.6, 450.7, 99/451; 107/55 R; 425/97, 133, 174.8 R

[56] References Cited
UNITED STATES PATENTS
3,505,948  4/1970  Carre et al. ............... 99/353
2,814,708  11/1957  Blass ............... 219/10.55 R
518,942  5/1894  Duhrkop ............... 425/97
3,256,838  6/1966  Booras ............... 99/353
3,374,729  3/1968  Owens ............... 99/353
3,494,723  2/1970  Gray ............... 99/451 X
2,014,384  9/1935  Kruttschnitt ............... 99/353 X Primary Examiner—Robert W. Jenkins
Assistant Examiner—Alan I. Cantor
Attorney, Agent, or Firm—Amster & Rothstein

[57] ABSTRACT

Cake is continuously baked without the use of baking pans by the extrusion of batter into a shaped baking chamber disposed in a microwave cavity. The product is moved through the baking chamber by maintaining the batter under pressure, by the use of conveyors, or by a reciprocating piston. In one embodiment, a filled cake product is produced by continuously and concurrently extruding a confectionery material into a cavity formed in the cake product during the baking process.

15 Claims, 10 Drawing Figures

PATENTED MAR 5 1974

INVENTOR
HOWARD ROTH ET AL
BY
Amster & Rothstein
ATTORNEYS

APPARATUS FOR MAKING CAKES

This application is a continuation-in-part of copending commonly assigned U.S. Pat. application, Ser. No. 836,385 filed June 25, 1969 and now abandoned.

This invention relates to apparatus for the production of bakery products. More particularly, the present invention is concerned with the continuous and automatic production of snack cake items.

In the manufacture of cakes, such as cupcakes or other snack items, it is conventional to use multi-cavity pans and batch-type processing. In such processes, a large number of pans are greased or otherwise prepared for the reception of baking dough; the dough is disposed in the pans; and the pans are placed in an oven and baked for from 20 to 40 minutes. This method of producing cakes is quite costly since it requires large ovens and extensive handling, maintenance and replacement of bakery pans. Moreover, in batch-type processing there is a constant need for adjustment of baking conditions particularly when starting up or shutting down the baking process. Such conditions, although extremely critical, are difficult to control when working with large ovens in which there is a substantial lag time between the adjustment of conditions and the actual attainment of those conditions within the oven. Batch-type processing is also extremely unwieldy and expensive where the cake will ultimately be filled with a confection such as butter creme or jelly since such filling requires separate processing, after baking, in which the cakes are slit or punctured and filled.

It is an object of this invention to provide apparatus for the continuous production of cakes.

A further object of this invention is to provide apparatus for the continuous production of cake items without the utilization of baking pans.

Yet another object of this invention is to provide apparatus for the continuous production of filled cake items in a single processing step.

These and other objects are accomplished by the continuous extrusion of cake batter through a specially designed combination of extrusion and baking apparatus. The present invention contemplates the continuous extrusion of a fluid cake batter through a baking tube disposed in a microwave cavity under carefully controlled conditions. In another embodiment, the present invention contemplates the continuous extrusion of a filled cake product in which the filling is added to the cake during the baking process under conditions designed to protect the filling from degradation by heat.

The invention will become apparent from the following description, taken in conjunction with the accompanying drawings wherein.

Figure 1:
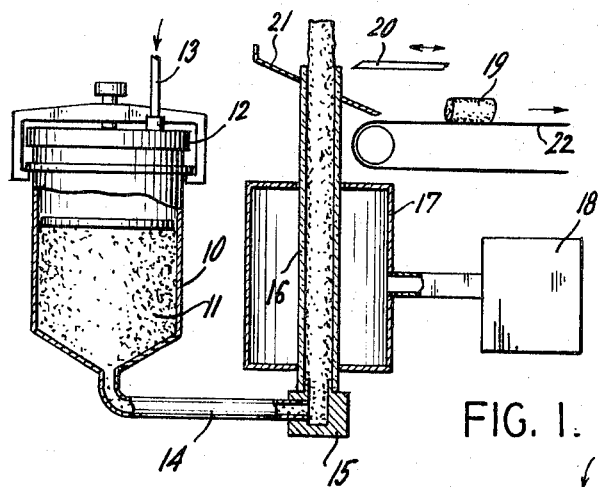
FIG. 1 is a vertical sectional view of an extruding and baking apparatus constructed in accordance with and embodying the invention.

Referring more particularly to the drawings, and in particular FIG. 1 there is shown a pressurized reservoir 10 capable of holding a large volume of cake batter 11. The reservoir is provided with a pressure cap 12 and conventional means 13 for applying and regulating the pressure within the reservoir. The batter 11 under the influence of pressure supplied via means 13 is forced through a conduit 14 into an extrusion nozzle 15.

Extrusion nozzle 15 is adjacent to a baking chamber 16 disposed in a baking apparatus or oven 17 comprising a microwave cavity in which intense rapid heating is achieved by means of a microwave energy power source schematically represented at 18. Although the present invention is not limited to the use of a particular type of microwave cavity, one typical cavity is described in U.S. Pat. 2,814,708 issued Nov. 26, 1957. Other microwave cavities or chambers, e.g., cavities employing folded wave guides or slow wave couplers may also be employed. The fluid cake batter 11 passes through the nozzle into the vertically disposed baking chamber, desirably cylindrical in configuration, where gelation of the batter and setting of the crumb occurs and exits from the opposite end of the baking chamber as a solid rod of baked cake. Thereafter the cake is cut into individual segments 19 by slicing means 20 which causes the individual segments to be deposited on an inclined plane 21 and thereafter onto conveyor 22 where they are conveyed to further processing and packaging.

The materials of construction and positioning of the above described baking and extruding apparatus are important features of the invention. Baking chamber 16 is constructed of a microwave transparent material which permits the microwave energy to pass into the cake batter which absorbs microwave energy and converts it to heat, e.g., glass, ceramics such as pyroceram, or plastics. While FIG. 1 illustrates a baking chamber in the form of a cylindrically shaped tube, it is apparent that the baking tube may be made of a variety of shapes which permit constant unimpeded passage of batter in various baking stages without departing from the invention.

In a preferred form of the invention the inner surfaces of the baking chamber are coated with a relatively slick non-stick, low friction type material so as to eliminate or minimize any tendency of the cake product to stick to the walls of the baking chamber. Typical materials for this purpose are fluorinated hydrocarbon polymers such as Teflon.

The length of the baking chamber is also a significant factor. Baking chamber 16 is longer vertically than oven 17 so that it extends a relatively short distance beyond the oven at the exit end. This permits continuous application of microwave energy while the baked cake exits from the microwave cavity. The cake, still a good absorber of microwave energy serves to minimize the amount of energy escaping through the port in the side of the microwave cavity.

When the apparatus is constructed and positioned as described above a wide variety of cake batters and conditions can be selected for the continuous production of cake product. A typical batter comprises milk, flour, shortening, sugar, whole egg, baking powder, salt and flavor in conventional proportions. This fluid batter is fed to the baking chamber at a rate dependent upon the size of the baking chamber, i.e., its length and diameter and the power input to the oven. The rate of movement of the batter through the chamber will be controlled by the pressure exerted on the batter via pressure means 13 as well as by the expansion and lifting effect of the leavening reaction within the baking chamber. As an illustration, the batter would be moved through the baking chamber at a rate of 1 to 40 pounds per hour or alternatively a rate which would result in a batter residence time within the oven of 5 to 120 seconds dependent upon the energy input to the microwave cavity.

In a typical example of the invention a batter consisting of 15 parts milk, 30 parts flour, 13 parts shortening, 25 parts sugar, 15 parts whole egg, 1 part baking powder, 0.5 parts salt and 0.5 parts flavor is extruded at a rate of 20 pounds per hour by exerting pressure on the batter in the reservoir. This rate results in a 30 second residence time in a baking chamber in which the microwave cavity is energized at a 2 kilowatt input.

Figure 2:
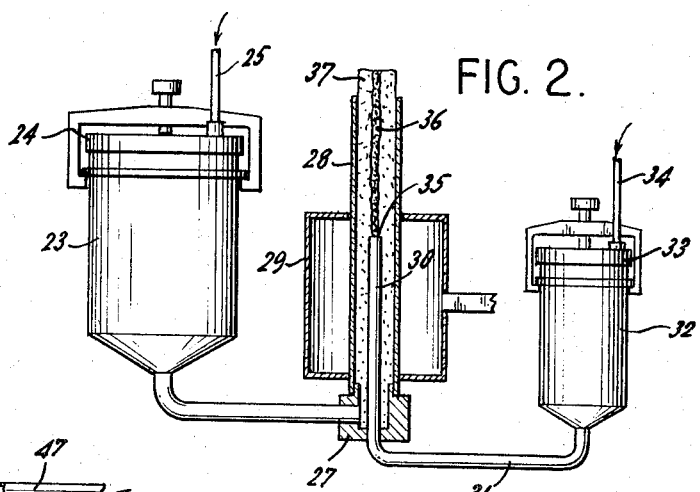
FIG. 2 is a schematic representation, in partial section of an apparatus for extruding, baking and filling a cake product in a single operation.

FIG. 2 shows the details of an apparatus designed for the continuous baking of a filled cake product. This apparatus includes a batter reservoir 23 having a pressure cap 24, means 25 for controlling the pressure and a flow pipe 26 leading to an extrusion nozzle 27, all as previously described with respect to the embodiment shown in FIG. 1. In addition, the apparatus is provided with a baking chamber 28 abutting and overlapping the extrusion nozzle 27 and disposed in a microwave cavity 29 all in essentially the same fashion and for the same purposes as previously described with respect to the apparatus of FIG. 1. Extrusion nozzle 27 is provided with a space through which centrally extends a tube 30. One end of the tube 30 is attached by means of a continuation 31 of tube 30 to a second pressurized reservoir 32 containing a confectionery filling such as jelly, butter creme or the like. Alternatively, the reservoir could contain a second cake batter in lieu of a confectionery material, e.g., when it is desired to produce a multi-cake product. The reservoir 32 has a pressure cap 33 and means 34 for applying and controlling the pressure whereby the flow of confection is regulated. The end of tube 30, indicated as nozzle 35 in FIG. 2, is critically positioned within the baking chamber 28. Confectionery material emanating from the nozzle 35 forms a filling 36 in the baked cake product 37. The confectionery filling fills the void in the baked cake product formed by the presence of tube 30 in the baking chamber 28. The nozzle is positioned within the baking chamber so that the confection enters the cake after the cake is at least partially set by the baking process so that the void formed by tube 30 is well defined. Preferably, the nozzle will be positioned near or at the exit point of the chamber 28, so that the confectionery material will not be subject to prolonged or intensive heating. Such heating would destroy or impair its taste and texture in the final product.

The heat sensitivity of the confectionery material is also a critical factor in the selection of the materials from which the tube 30 is constructed. It is essential that the tube be constructed of materials which reflect microwaves, i.e., materials that will not pass the microwaves to which the batter in the baking chamber is being subjected in the instances where heat sensitivity of the confection is a problem. Thus, the pipe 30 should be made of the metallic materials previously described in connection with extrusion nozzle 15. By the utilization of such materials, only that small amount of heat which passes through the tube 30 by conduction will reach the confectionery material and this heat can be further reduced by increasing the thickness of the pipe walls. In a preferred embodiment the tube 30 has its outer walls coated with a non-sticking surface such as a fluorinated hydrocarbon polymer, e.g., teflon, so as to prevent sticking of the partially baked cake product to the walls of the tube.

It will readily occur to those persons skilled in the art that in alternative forms of the invention the tube 30 may serve as a baking chamber for a second baked product. In those instances the tube will be constructed of materials which are transparent to microwaves, as heretofore described.

Figure 3:
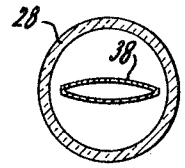
FIG. 3, 4 and 5 are cross sectional views of alternate embodiments of the extrusion tube of FIG. 2.
Figure 4:
Figure 5:
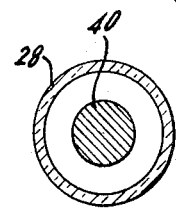

FIG. 3, 4 and 5 are alternate forms of the extrusion tube 30 illustrated and described in FIG. 2. In FIG. 3, the tube 38 is of a flat eliptical shape and the confection is distributed in the eliptical void formed within the cake product disposed between the baking chamber 28 and the outer wall of the nozzle 38. In FIG. 4, the tube 39 is of a spiral configuration and the confection will be distributed in the final baked product within the spiral void formed in the cake product. Confectionery extrusion apparatus of the type contemplated for use in the present invention are fully described in Fries, et al., U.S. Pat. No. 3,314,381 issued Apr. 18, 1967. It will be evident to persons skilled in this art that a variety of tube shapes can be adopted depending only upon the amount and distribution of the confection desired in the final product and that the baking chamber may also take on a variety of shapes.

In lieu of the extrusion tube 30,38 or 39, a cylinder such as 40 in FIG. 5 may be inserted within the baking tube. In this embodiment the baked product will be extruded in the form of a hollow cake which, in subsequent processing steps, may be filled with ice cream or other frozen confection.

Figure 6:
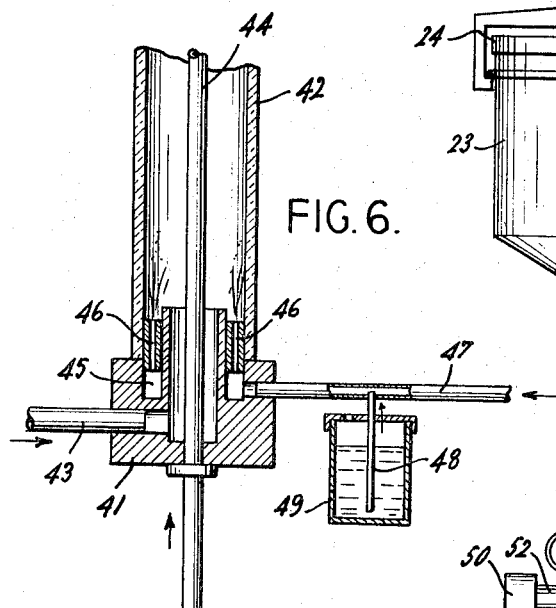
FIG. 6 is a vertical sectional view of an alternative embodiment of the baking apparatus of FIG. 2.

A preferred embodiment of the apparatus described in FIGS. 1 and 2 is depicted in FIG. 6. In this embodiment additional means are provided for continuously greasing the baking chamber so as to prevent sticking of the baked product. FIG. 6 illustrates the extrusion nozzle and baking chamber previously described in detail with respect to FIG. 2 including an extrusion nozzle 41 abutting a baking chamber 42 and having a batter inlet pipe 43 and a confection extrusion tube 44 disposed in the nozzle and extending into the baking chamber. The nozzle 41 has an additional inlet port 45 leading to spray nozzle 46 disposed around the inner circumference of the abutting baking chamber 42. Leading to said inlet port 45 is a pipe 47 which contains an edible lubricant which will be continuously sprayed on the inner surface of the baking chamber. In the embodiment illustrated in FIG. 6 inlet pipe 47 contains air under pressure and has attached thereto through pipe 48 a reservoir 43 of the edible lubricant. The pressurized air rushing through pipe 47 creates a partial vacuum at its juncture with pipe 48 thereby taking up the lubricant in the air stream which is emitted in aerosol form through spray nozzles 46.

Figure 10:
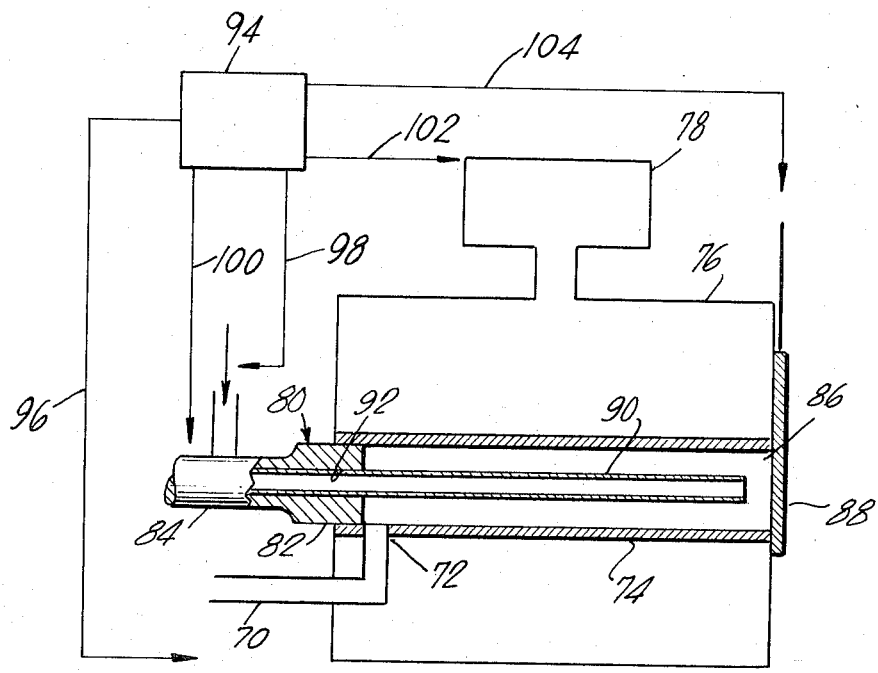
FIG. 10 is a sectional view of another form of the invention embodying apparatus for extruding, baking and filling a cake product in a single operation.

FIG. 10 illustrates a modified form of the invention described in FIGS. 1–6 wherein the movement of the batter through the baking chamber is assisted by physical means and baked goods are produced on a continuous basis. In this embodiment, cake batter is fed from a reservoir (not shown) as previously described and illustrated in FIGS. 1 and 2, through a conduit 70 to an inlet opening or discharge nozzle 72 in a baking chamber 74. The chamber is disposed in a baking apparatus or oven 76 comprising a microwave cavity. Intense rapid heating is achieved by means of a microwave energy power source schematically represented at 78. The nature of the microwave cavity, as well as the materials used to construct the extrusion nozzle and baking chamber are similar to that previously described in connection with the other embodiments of the invention.

The baking chamber 74 adjacent to batter nozzle 72 is provided with a slideable member such as piston 80 having a head 82 and a shaft 84, the operation of which will be more fully described hereinafter. The outlet end of baking chamber 74 is provided with an outlet opening 86 and a closure member 88 which is movable between a closed position as shown in FIG. 10 and an open position in which the closure member is moved to a position which does not obstruct the outlet opening 86 of baking chamber 74 and permits the cake formed in the baking chamber to exit therefrom and be carried away by a suitable conveyor (not shown). Both the slideable member 80 and the closure member 88 are constructed of microwave reflective materials.

In the operation of the apparatus of FIG. 10 to continuously produce baked goods, a pre-determined charge of cake batter is permitted to flow into the baking chamber, the chamber and cavity are sealed off at their respective opposite ends by the slideable member 80 and the closure member 88 to eliminate microwave leakage, the microwave cavity is energized for a time sufficient to accomplish baking of the batter, the microwave cavity is de-energized, the closure member at the oulet end of the baking chamber is opened and the slideable member is moved through the baking chamber to push out the finished baked product. As will be described more fully hereinafter by the use of suitable timing devices which are well known in the art, the above-described cycle may be automatically synchronized and continuously repeated to continuously produce finished baked goods.

The amount of batter charged to the baking chamber in each cycle will depend upon the size and shape of the baking chamber and will be selected so that upon gelation of the batter and setting of the crumb, the cake formed will fill and be shaped by the chamber. Ordinarily, the volume of batter charged will be 40 to 60 percent, e.g., 50% of the chamber volume, although changes in the nature of the batter composition may require a greater or lesser volume.

The manner in which the pre-determined charge of batter is fed to the baking chamber, is a critical feature of this embodiment of the invention. Unless the flow of batter in conduit 70 is properly insulated from the source of microwave energy during the baking cycle, the batter in the conduit will also be baked and clog the system. The present invention avoids this problem by virtue of the movement of piston 80 which is constructed of a microwave reflective material to a position which completely blocks the inlet nozzle 72 as well as the inlet end of the baking chamber after the pre-determined charge of batter has been fed to the baking chamber. In addition, those portions of batter conduit 70 which may be exposed to the microwaves are constructed of or covered with suitable microwave reflective material.

It will be obvious to those persons skilled in the art that suitable timing circuits which are dependent upon the required residence time of the batter in the baking chamber and the required flow time of the batter through conduit 70 may be devised so that the movement of piston 80, the flow of batter through conduit 70, the flow of microwave energy, and the movements of closure member 88 will occur in proper sequence. FIG. 10 includes an illustration of a control means 94 and control arrows 96, 98, 100, 102, and 104, representative of suitable timing circuits, for controlling the sequence of operations. In accordance with that sequence, batter will be permitted to flow to baking chamber 74 for a predetermined time interval based upon the flow rate of the batter and the amount of batter desired in the baking chamber, whereupon the piston 80 will be actuated and will be moved a distance sufficient to block discharge nozzle 72. In addition, the flow of batter from the reservoir may optionally be interrupted either by the movement of the piston forward or by a suitable timing circuit and valves associated with the batter reservoir. Similarly, the movement of the piston may actuate the microwave energy source which will remain operative for a pre-determined time interval sufficient to bake the batter. When the pre-determined time interval has elapsed, the closure member 84 will be actuated to the open position and simultaneously therewith, the piston 80 will move forward through the baking chamber thereby removing the finished baked product from the chamber. Subsequently, the piston is withdrawn to its original position thereby reactuating the flow of batter to the baking chamber and recommencing the cycle.

The apparatus of FIG. 10 may also be provided with a confectionery filling tube of the type and construction previously described in connection with FIGS. 2 and 6 of the invention. In one preferred embodiment, the confectionery filling tube 90 may pass through a hole 92 provided in piston 80 and will terminate within the baking chamber near its outlet end. The confection reservoir (not shown) may be equipped with a valve or other feed device actuated by an appropriate timing circuit so that the flow of confectionery material is synchronized with the movement of the piston 80 through the baking chamber and the void created by the confectionery tube is filled with confectionery fluid as the baked cake exits from the chamber.

Although not illustrated in FIG. 10, it will also be obvious that many of the features described with respect to the embodiments of the invention illustrated in FIGS. 1–6, may be employed in this embodiment. For example, the piston may be adapted for lubricating the baking chamber during the reverse stroke cycle of the piston after having pushed out the finished baked product. Similarly, any of the various sizes and shapes of confectionery filling tubes and baking chambers previously described are also useful in this embodiment.

Figure 7:
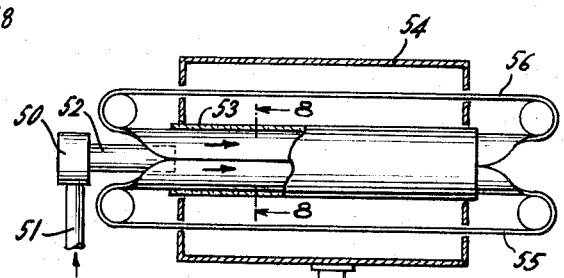
FIG. 7 is a schematic cross sectional view, in partial section, of an alternate extruding and baking apparatus utilizing and endless belt conveyor.
Figure 8:
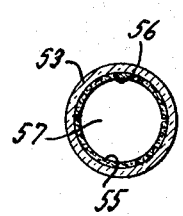
FIG. 8 is a cross sectional view taken along the line 8—8 in FIG. 7.

FIGS. 7 and 8 illustrate an alternative embodiment of a continuous baking and extrusion apparatus which employ an endless belt extruding and baking apparatus. In those embodiments the utilization of baking pans has also been eliminated and a high degree of quality control may be achieved by continuous visual observation of the baked product at the exit of the conveyor.

FIG. 7 illustrates a batter extrusion nozzle 50 having a pipe 51 leading from a pressurized batter reservoir (not shown). An extended portion 52 of the nozzle 50 is disposed in baking chamber 53 which is disposed within a microwave cavity 54. The nozzle, baking chamber and cavity are constructed of the same materials and positioned in generally the same relationship with respect to each other as previously described with respect to the embodiments of FIGS. 1 and 2. Unlike the previous embodiments, however, the baking chamber 54 is preferably horizontally disposed in the microwave cavity and has a pair of endless belt conveyors 55 and 56 passing therethrough. As best seen in FIG. 8 conveyors 55 and 56 pass through baking chamber 53, which is preferably cylindrical, and are contorted thereby so as to assume the shape of the baking chamber. The width of the conveyor belts is selected so that after being drawn into the baking chamber each conveyor belt will conform to one-half of the inner circumference of the baking chamber and together form a cylinder 57 into which the fluid batter is extruded. The batter expands into this cylinder as it is continuously moved through the baking chamber by the movement of conveyor belts 55 and 56.

The conveyor belts 55 and 56 are flat belts constructed of a conventional rubberized fabric, e.g., neoprene impregnated cloth. In a preferred embodiment the fabric is coated with a nonstick surface such as teflon or the like and as mentioned is microwave transparent.

Figure 9:
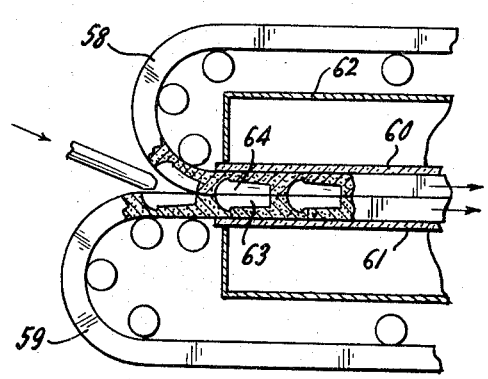
FIG. 9 is a fragmentary vertical sectional view of another form of the invention embodying an endless belt method for continuous production of cake products.

FIG. 9 illustrates an additional embodiment for the continuous production of baked products. In this embodiment a pair of parallel conveyor belts 58 and 59, constructed of materials previously described herein, are drawn together through a pair of microwave transparent parallel plates 60 and 61 which define a baking chamber disposed in a microwave cavity. The conveyor belts are each relatively thick and are provided with matable, shaped hollows 63 and 64 molded into their thickness so that when they are brought together within the baking chamber the hollows will be aligned and form a mold that will impart its shape to the cake batter. The batter is deposited by nozzle 65 on conveyor belt 59 prior to its entry into the baking chamber. The baked product conforming to the shape of the mold will be continuously removed from the exit end of the baking chamber (not shown) when the conveyor belts separate so as to open a mold.

It will readily occur to those persons skilled in the art that a number of variations and modifications can be made without departing from the true scope of the invention which will not be pointed out in the appended claims.

What is claimed is:

1. Apparatus for the production of baked goods comprising a nozzle having a discharge opening and adapted to extrude a fluid batter, a baking chamber positioned relative to the discharge end of said nozzle to receive said batter, said baking chamber being constructed of microwave transparent material, a microwave cavity, said baking chamber being disposed in said cavity and pressure means for moving said batter through said nozzle and said baking chamber to form a baked product.

2. Apparatus according to claim 1 in which said baking chamber is vertically disposed in said cavity.

3. Apparatus according to claim 2 in which said baking chamber is a cylindrical tube which passes through said cavity and extends beyond said cavity at its exit end.

4. Apparatus according to claim 1 including lubricant spray means positioned around the outer circumference of said nozzle discharge opening whereby the inner walls of said baking chamber are lubricated.

5. Apparatus according to claim 1 including a shaped member disposed within said baking chamber and extending axially therethrough to define a hollow in said baked product.

6. Apparatus according to claim 5 in which said shaped member is constructed of a microwave reflective material.

7. Apparatus according to claim 5 in which said shaped member is tubular and has an outlet end for emitting confectionery fluid into the hollow formed in said baked product, said outlet end being positioned substantially at the point of exit of said baking chamber from said cavity and fluid pressure means for moving confectionery fluid through said tubular member to fill said hollow in said baked product.

8. Apparatus for the production of baked goods comprising a nozzle having a discharge opening and adapted to extrude a fluid batter, a baking chamber positioned relative to the discharge end of said nozzle to receive said batter, said baking chamber having an open outlet end and being constructed of microwave transparent material, means for temporarily closing off the inlet end of said baking chamber, said discharge opening of said nozzle and said outlet end of said baking chamber, a microwave cavity, said baking chamber being disposed in said cavity, means for moving said batter through said nozzle into said baking chamber, means for activating said microwave cavity after said discharge opening and said inlet and outlet ends of said baking chamber are closed, means for reopening said outlet end of said baking chamber and de-activating said cavity and means for removing the baked product formed in said baking chamber from said chamber.

9. Apparatus according to claim 8 wherein said closure means are constructed of microwave reflective material.

10. Apparatus according to claim 8 wherein said closure means for said nozzle is a slideable member positioned within said baking chamber.

11. Apparatus according to claim 10 wherein said means for removing said baked product from said baking chamber is said slideable member.

12. Apparatus according to claim 8 including a shaped member disposed within said baking chamber and extending axially therethrough to define a hollow in said baked product.

13. Apparatus according to claim 12 in which said shaped member is constructed of microwave reflective material.

14. Apparatus according to claim 12 wherein said shaped member is tubular and the outlet end of said tubular member is disposed within said baking chamber and further including means for moving an edible material through said tubular member.

15. Apparatus for the production of baked goods comprising a nozzle having a discharge opening and adapted to extrude a fluid batter, a baking chamber positioned relative to the discharge end of said nozzle to receive said batter, said baking chamber having an open outlet end and being constructed of microwave transparent material, a moveable closure member for said outlet end, a slideable member mounted in said baking chamber and adapted to close off the inlet end of said baking chamber, a microwave cavity, said baking chamber being located in said cavity and control means for sequentially admitting a pre-determined amount of batter through said discharge opening, sealing off said baking chamber, activating said microwave cavity for a time sufficient to bake said batter, and moving said slideable member through said chamber.

* * * * *